US010922667B2

(12) United States Patent
Chen

(10) Patent No.: US 10,922,667 B2
(45) Date of Patent: Feb. 16, 2021

(54) TRANSACTION INTERACTIONS BETWEEN NODE GROUPS

(71) Applicant: Advanced New Technologies Co., Ltd., George Town (KY)

(72) Inventor: Guanhua Chen, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 474 days.

(21) Appl. No.: 15/834,976

(22) Filed: Dec. 7, 2017

(65) Prior Publication Data
US 2018/0096324 A1  Apr. 5, 2018

Related U.S. Application Data

(63) Continuation of application No. PCT/CN2016/084627, filed on Jun. 3, 2016.

(30) Foreign Application Priority Data

Jun. 11, 2015 (CN) .......................... 201510320202.9

(51) Int. Cl.
*G06Q 20/16* (2012.01)
*H04W 4/24* (2018.01)
(Continued)

(52) U.S. Cl.
CPC ........... *G06Q 20/16* (2013.01); *G06F 9/5027* (2013.01); *G06F 9/5077* (2013.01); *G06Q 20/10* (2013.01);
(Continued)

(58) Field of Classification Search
CPC ........ G06Q 50/01; G06Q 10/10; G06Q 40/12; G06Q 20/22; G06Q 30/02; H04L 51/32; H04L 12/1818
See application file for complete search history.

(56) References Cited

U.S. PATENT DOCUMENTS 6,320,947 B1  11/2001  Joyce et al.
2007/0055771 A1*  3/2007  Tantawi .................. G06F 9/505
                                                                 709/224
(Continued)

FOREIGN PATENT DOCUMENTS

CN  1524245     8/2004
CN  101056238   10/2007
(Continued)

OTHER PUBLICATIONS

Search Report and Written Opinion by the Intellectual Property Office of Singapore issued in Singapore Application No. 11201709848S dated Jul. 6, 2018; 8 pages.
(Continued)

*Primary Examiner* — Philip J Chea
*Assistant Examiner* — Mohammed Ahmed
(74) *Attorney, Agent, or Firm* — Fish & Richardson P.C.

(57) ABSTRACT

A correlation request is received for correlating an object node to a node group. A resource acquisition request is initiated, preset by the node group to the object node. Creditable resources of the object node are queried, and whether the creditable resources include a target resource required by the resource acquisition request is verified. When the server verifies the creditable resources include a target resource, the target resource is extracted from the creditable resources of the object node and the object node is correlated to the node group.

15 Claims, 11 Drawing Sheets

(51) Int. Cl.
*G06Q 50/00* (2012.01)
*G06Q 20/10* (2012.01)
*G06F 9/50* (2006.01)
*H04L 12/14* (2006.01)
*H04L 12/24* (2006.01)

(52) U.S. Cl.
CPC ............ *G06Q 50/01* (2013.01); *H04L 12/14* (2013.01); *H04W 4/24* (2013.01); *H04L 41/5051* (2013.01)

(56) References Cited

U.S. PATENT DOCUMENTS

| | | |
|---|---|---|
| 2007/0220090 A1 | 9/2007 | Hall |
| 2008/0004974 A1 | 1/2008 | Bawcutt |
| 2010/0121745 A1 | 5/2010 | Teckchandani et al. |
| 2010/0312696 A1* | 12/2010 | Sinha ............... G06Q 40/06 705/40 |
| 2011/0196855 A1* | 8/2011 | Wable ............... G06Q 30/02 707/711 |
| 2012/0079091 A1* | 3/2012 | Ermis ............... H04L 41/024 709/223 |
| 2013/0211980 A1* | 8/2013 | Heiferman ......... G06Q 50/01 705/30 |
| 2015/0073959 A1 | 3/2015 | Connors et al. |
| 2015/0127526 A1 | 5/2015 | Ye et al. |
| 2015/0180948 A1* | 6/2015 | Shao ............... H04L 67/10 709/203 |
| 2015/0220500 A1* | 8/2015 | Katic ............... G06F 40/14 715/207 |
| 2015/0264092 A1* | 9/2015 | Herger ............... H04L 65/403 709/204 |
| 2015/0293997 A1* | 10/2015 | Smith ............... G06F 16/95 707/749 |
| 2016/0253679 A1* | 9/2016 | Venkatraman ..... G06Q 30/0185 705/310 |
| 2016/0350694 A1* | 12/2016 | Appel ............ G06Q 10/063112 |

FOREIGN PATENT DOCUMENTS

| | | |
|---|---|---|
| CN | 101256656 | 9/2008 |
| CN | 102184505 | 9/2011 |
| CN | 102708488 | 10/2012 |
| CN | 103020839 | 4/2013 |
| CN | 103297280 | 9/2013 |
| CN | 103731435 | 4/2014 |
| CN | 103870976 | 6/2014 |
| CN | 104036387 | 9/2014 |
| CN | 104618322 | 5/2015 |
| CN | 104636921 | 5/2015 |
| JP | 2002269351 | 9/2002 |
| JP | 2005184038 | 7/2005 |
| JP | 2013522755 | 6/2013 |
| JP | 2013528848 | 7/2013 |
| KR | 20070039633 | 4/2007 |
| KR | 20090024182 | 3/2009 |
| KR | 20140010621 | 1/2014 |
| WO | WO 2011158124 | 12/2011 |
| WO | WO 2015035417 | 3/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Preliminary Report on Patentability in International Application No. PCT/CN2016/084627, dated Dec. 12, 2017, 10 pages (with English Translation).
International Search Report issued by the International Searching Authority in International Application No. PCT/CN2016/084627 dated Sep. 2, 2016; 10 pages.

* cited by examiner

TRANSACTION INTERACTIONS BETWEEN NODE GROUPS

This application is a continuation of PCT Application No. PCT/CN2016/084627, filed on Jun. 3, 2016, which claims priority to Chinese Patent Application No. 201510320202.9, filed on Jun. 11, 2015, and each application is incorporated by reference in its entirety.

BACKGROUND

The coming of the Internet age resulted in broad applications of the Internet in people's daily study, work, and life. Various daily transactions of people may be represented using a network. Generally, a network is provided with multiple nodes and node groups. A node group is a correlated group of multiple nodes, and a node group is correlated to nodes included therein. Moreover, a same node may establish the correlation with multiple node groups to participate in transaction interactions of the multiple node groups.

Transaction interactions of a node group may consume resources corresponding to nodes in the node group. In order to ensure sustainability of transaction interactions of a node group, it is necessary to apply for resources from corresponding nodes according to resources consumed by each transaction interaction, which causes low efficiency in the transaction interactions of the node group.

SUMMARY

The present disclosure describes providing transaction interactions between node groups.

In an implementation, a correlation request is received for correlating an object node to a node group. A resource acquisition request is initiated, preset by the node group to the object node. Creditable resources of the object node are queried, and whether the creditable resources include a target resource required by the resource acquisition request is verified. When the server verifies the creditable resources include a target resource, the target resource is extracted from the creditable resources of the object node and the object node is correlated to the node group.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the subject matter described may enable network nodes to establish a group according to a resource attribute condition. Second, the subject matter described improves efficiency in transaction interactions of the node group by using a network combining both a social network and a payment network.

The details of one or more implementations of the subject matter of this specification are set forth in the Detailed Description, the Claims, and the accompanying drawings.

Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1A:
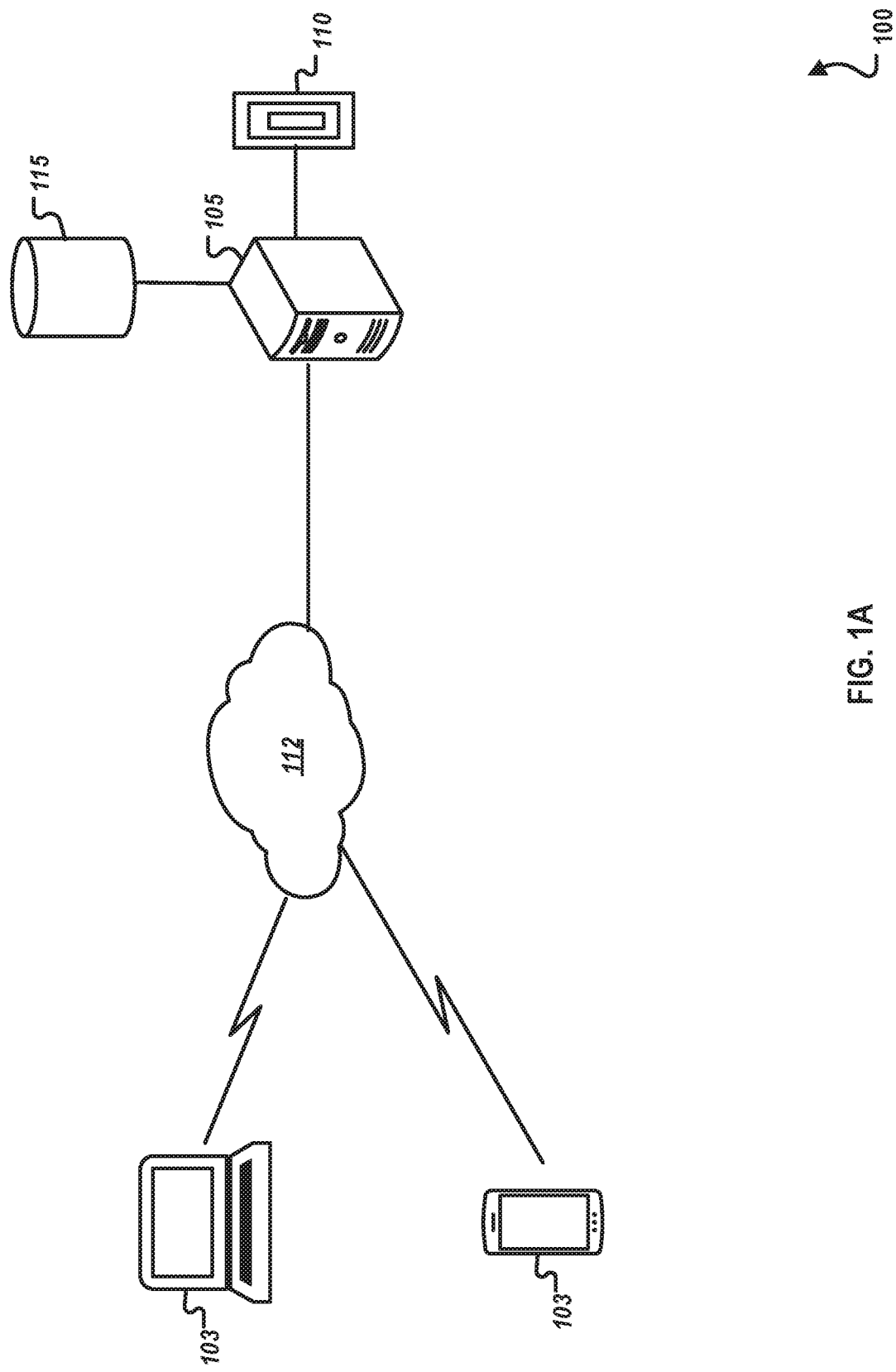
FIG. 1A is a block diagram illustrating an example of a computer-implemented system configured to provide transaction interactions between node groups, according to an implementation of the present disclosure.

The following detailed description describes providing transaction interactions between node groups, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

It may be beneficial for a payment network to communicate transactions across architectures of pre-existing social networks. In some implementations, by integrating payment networks using the social network structure already in existence for social network applications (such as, FACEBOOK, TWITTER, YOUTUBE, WECHAT, and WEIBO), a payment structure may be implemented over instant messaging services provided by the social network applications. For example, over WEIBO's instant messaging chat, a user can initiate a transaction interaction to another user without using another application to initiate the transaction.

In some implementations, a transaction interaction environment may enable network nodes to establish a group according to a resource attribute condition. Interactions among nodes in the group may be based on a resource admittance threshold, and a consumption verification solution of resources in the group is achieved by means of resource authorization. Therefore, transaction interaction between nodes in the group and transaction interactions with a node outside of the group or with another node group may be realized.

In some implementations, a network may be a social network or a payment network. The network may also combine the social network or the payment network. In other implementations, the network may be a structure that is formed after adaptive improvements or changes conducted on the basis of a conventional network (for example, the social network and the payment network) and is applicable to network applications. For example, a social network may be applicable to FACEBOOK, TWITTER, YOUTUBE, LINKEDIN, WECHAT, WEIBO, and so on, as well as other instant messaging networks. These payment networks may be applicable to applications such as PAYPAL or ALIPAY. In some implementations, functions of the payment network and the social network may be superimposed. The functions of superimposition may require superimposition and integration of data representing real world properties. The functions of superimposition allow a first user in a social network to transfer money to one or more other users. Alternatively, in a payment network, a first user can communicate with another user. For example, WECHAT is an instant messenger tool and allows a user to transfer money to other people of the instant messenger application.

In some implementations, a network node includes a social attribute and a payment attribute. For example, the social attribute includes a function that connects one user profile with another user profile. In another example, the payment attribute includes a function for one user profile to pay a form of currency to another user profile. In some implementations, the social network may invest a network node with basic description information including person-related basic attributes. For example, person-related basic attributes may include person-related social relationship attributes between one or more persons. In addition, person-related social relationship attributes may include attributes between a person and an organization in addition to person-related basic natural attributes.

In some implementations, the payment network may invest a node with basic payment description information. For example, the basic payment description information may include an account and virtual currencies or an equivalent corresponding thereto, or even a direct coupon that represents real world currencies. In some implementations, the virtual currencies or equivalent may have a certain conversion relationship with the coupon, and therefore may represent its wealth attribute in a network world in a manner of being correlated to the network node.

FIG. 1A is a block diagram illustrating an example of a computer-implemented system 100 configured to provide transaction interactions between node groups, according to an implementation of the present disclosure. In some implementations, the architecture of system 100 includes various network nodes utilized to implement information communication over a network to achieve interaction and data processing. The architecture of system 100 includes an operation server 105. The operation server 105 performs communicating with one or more client terminals 106 over a network 112, and a database 115 that can be integrated in the operation server 105 or independent of the operation server 105. The operation server 105 may correspond to a service platform of a social network, or correspond to a service platform of a payment network. In some implementations, the operation server 105 may be included in a network that accomplishes payment by means of social network integration, where a social network platform and a payment network platform are integrated.

In some implementations, a network 112 may include a wired or wireless telecommunication apparatus. The architecture of system 100 may include one or more networks 112. In some implementations, a network apparatus on which the client terminal 106 is based on may exchange data using the wired or wireless telecommunication apparatus. In some implementations, the terms "data" and "information" may be interchangeably used to refer to texts, images, audio, video, or information of any other form existing in a computer-based environment.

In some implementations, a network apparatus on each client terminal 106 may include an apparatus that has a communication module capable of sending and receiving data over the network 112. In some implementations, FIG. 1A depicts a network apparatus in which a client terminal 106 may be operated respectively by a final user or consumer, a possible counterparty user, a publisher of a social network system, and an operator waiting for payment.

A user (including an individual or an organization) may use an application such as a webpage browser application or an independent application, to view, download, upload, or access, in other manners, a file or web page using the network 112. The network 112 may include a wired or wireless telecommunication system or apparatus. The network apparatus (including the server 105 and the client device 106) may exchange data using the wired or wireless telecommunication apparatus. In some implementations, an application of a web page browser application or independent application may interact with a web page server (or another server, such as a social platform and a payment platform) connected to the network 112.

In some implementations, the network apparatus on which each client terminal 106 is based can be provided with a digital wallet application module in the form of software, hardware, or even a combination of software and hardware. The digital wallet covers any application, hardware, software, or process for helping the client terminal 106 accomplish a purchasing transaction. The digital wallet may be separated from and interact with the web page browser application. In particular, the digital wallet may be implemented as a supporting application of the web page browser application. As a supporting application, the digital wallet is executed in the web page browser application. If the digital wallet is separated from the web page browser application, the digital wallet may access the network 112 using any available communications technology in the system 100.

In some implementations, the client terminal 106 provides or acquires one or more contact applications according to user information carried. The contact application is any program or application of a user contact list that is installed in the client terminal 106 and used for maintaining social network accessibility. An instance of the contact application includes, but is not limited to, an email application, a short message application, instant messaging, a calendar invitation list, or a contact database such as OUTLOOK or ACT, or a friend (or, for example, classified friend, stranger, or blacklist) to provide a program, an interface, or a menu of social software, which includes an online state, an offline state, an invisible state, a busy state, or even a managed state. Contacts in the contact application are ranked according to priorities based on various factors. The factors include, for example, a communication frequency or a social relationship with the user carried by the client terminal 106, the number of contact applications in which a particular contact appears, or any other priority-ranking factor that can be extracted from the application.

In some implementations, the architecture of system 100 may be a network that accomplishes payment by means of social network integration. The system 100 includes a social network platform and a payment network platform that may be integrated. Then, the server 105 may have functions of a server in the social network. At this time, the social network server 105 represents a computer-implemented system, in which the social network system utilizes to manage a social website and using configuration files and communities of the social website. In some implementations, the social network represents any web page-based community allowing a user to interact, using the Internet, with other users generally having common interests or common relationships. An instance of a social network that the client terminal 106 may join or interact with is provided.

In some implementations, the social network server 105 provides, to the client terminal 106, a member list of an online community of a user of the client terminal. The social network system on the social network server 105 may rank, according to one or more priorities, relationships between each community member and the user of the client terminal 106. The social network server 105 determines relationships by factors of a structure applicable to each specific social networking system. For example, a social network system such as FACEBOOK can classify community members into "friends" or "friends of friends", and LINKEDIN may classify members into first level contacts, second level contact, or this level contacts.

In some implementations, the social network system server 105 communicates with one or more client terminals 106 using any available technology. For instance, the technologies may include, but are not limited to, an Internet connection over the network 112, email, short message, instant messaging, or any other suitable communication technologies. The social network system includes a data storage unit 115 accessible to the social network server 105. The data storage unit 115 may include one or more physical computer readable storage devices.

In some implementations, the architecture of system 100 is a network that accomplishes payment by means of social network integration. The system 100 includes a social network platform and a payment network platform. In some implementations, the system 100 integrates the social network platform and the payment network platform to a single platform. Then, the server 105 includes functions of a server in the payment network. At this time, the payment network server 105 represents a computer-implemented system, which the payment network system utilizes to manage a payment platform, and use all configuration files of the payment platform as well as storage of relationship data and payment data. In some implementations, the payment network can represent any web page-based community that allows a user A to interact, using the Internet, with other users. The user A can have a set of preferred users to contact. These preferred users can be users that user A typically contacts for payment requests or purchasing requests, such as favorites.

In some implementations, different client terminals, such as client terminals 106, may be counterparties of each other. Any of the counterparties represents an individual or an organization. For example, a counterparty may include a payer, a payee, message sender, or a message receiver, to name a few examples. In this case, client terminals can acquire to-be-read data or to-be-executed processing data from connected database 116 that is involved in a transaction, such as a payment process. To-be-written data or a processing result that is involved in the payment transaction process is stored in the connected database 116.

As illustrated in FIG. 1A, a computing device 103 is integrated with or separated from the operation server 105. Especially, in the latter situation, the computing device 103 and the operation server 105 may generally be connected using an intranet or a private network, or may be connected using an encrypted public network. Particularly, when the computing device 103 is integrated with the operation server 105, they may be connected by using an internal bus that is more efficient and has a faster transmission speed. The computing device 103, when being integrated or separated, can access the database 115 directly (not shown) or using the operation server 105.

In some implementations, the computing device 103 is properly programmed, and can receive one or more instructions to control implementation of the method in the present application. Particularly, when the computing device 103 is integrated, a transaction processed by the computing device 103 is considered as processing of the operation server 105, without the need of being particularly distinguished.

Figure 1B:
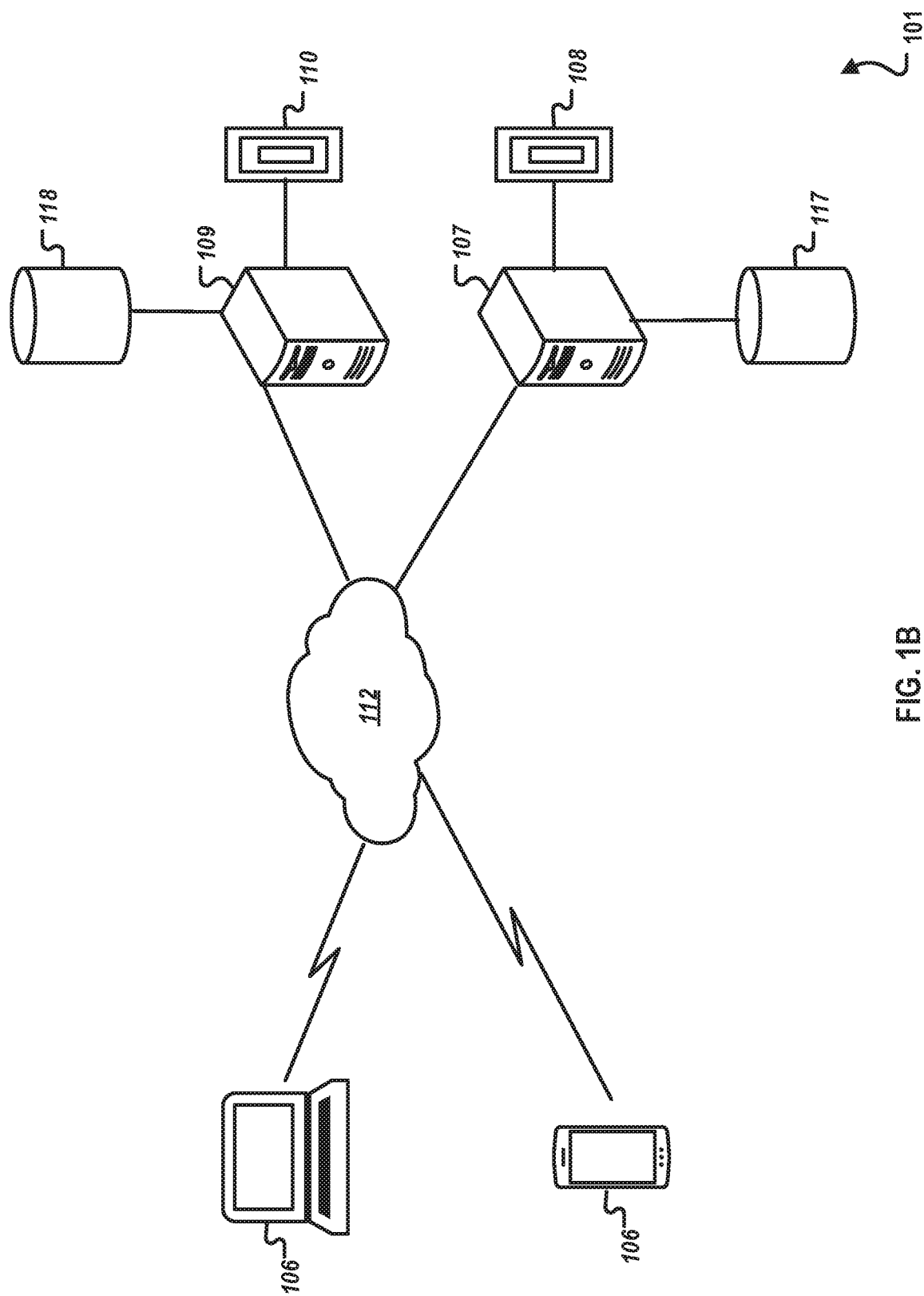
FIG. 1B is a block diagram illustrating another example of a computer-implemented system configured to provide transaction interactions between node groups, according to an implementation of the present disclosure.

FIG. 1B is a block diagram illustrating another example of a computer-implemented system 101 configured to provide transaction interactions between node groups, according to an implementation of the present disclosure. In some implementations, FIG. 1B illustrates a system architecture in a separated social network and payment network. The architecture of system 101 includes operation servers 107 and 109 that perform data communication with one or more client terminals 106 using the network 112, a computing environment 108 that can be integrated in or independent of the operation server 107, and a computing environment 110 that can be integrated in or independent of the operation server 109. In an instance, the operation server 107 corresponds to a service platform of the social network, and the operation server 109 corresponds to a service platform of the payment network. In some implementations, a corresponding database 117 may provide or store required social network data and operation data. A corresponding database 118 provides or stores required payment network data and operation data. Other attributes are similar to the previously described description corresponding to FIG. 1A, and are not repeated.

Figure 2:
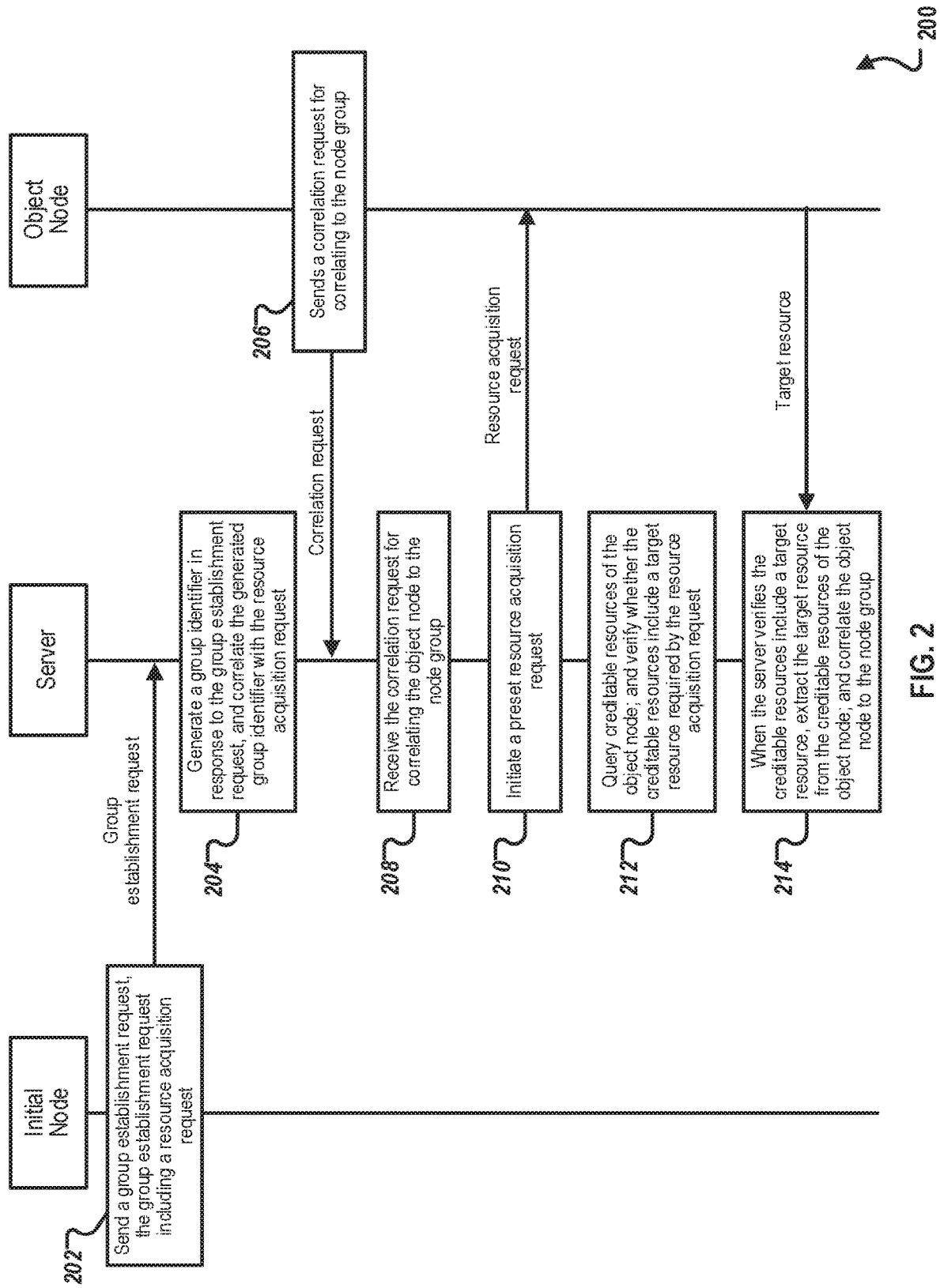
FIG. 2 is a flowchart illustrating an example of a computer-implemented method configured to provide transaction interactions between node groups, according to an implementation of the present disclosure.

FIG. 2 is a flowchart illustrating an example of a computer-implemented method 200 configured to provide transaction interactions between node groups, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, an initial node sends a group establishment request to a server, the group establishment request including a resource acquisition request. For example, a resource acquisition request can include a request from a user on a social network to set up a chat group to one or more other users. The initial node may be any node in a network. In particular, any node in the network sends a group establishment request to the server. For example, a group establishment request can include a request to retrieve an item, such as a monetary transfer request, from one user to another user. Correspondingly, the node sending the group establishment request may be used as an initial node that correlates with a corresponding node group first.

In some implementations, the resource acquisition request is a request set by the initial node and allows the server to extract resources from an established node group when the initial node is correlated with the node group. An object to which the resource acquisition request is oriented includes the initial node and other nodes applying for being correlated with the established node group. From 202, method 200 proceeds to 204.

At 204, in response to the server receiving the group establishment request from the initial node, the server generates a group identifier in response to the group establishment request, and correlates the generated group identifier with the resource acquisition request. The group identifier is used for identifying a correlation relationship between a node and a corresponding node group. In some implementations, different node groups in the network may have different group identifiers, to identify node groups correlated with the nodes in the network. After the server correlates the group identifier with the resource acquisition request, the resource acquisition request uniquely corresponds to the group identifier. In other words, it is equivalent that the resource acquisition request is preset by a node group corresponding to the group identifier. From 204, method 200 proceeds to 206.

At 206, an object node sends, to the server, a correlation request for correlating to the node group. For example, a correlation request includes a request to join in a group, such as a chat group. The object node may be any node in the network except for the initial node. From 206, method 200 proceeds to 208.

At 208, the server receives the correlation request for correlating the object node to the node group. The server stores the received correlation request in its internal memory. From 208, method 200 proceeds to 210.

At 210, the server initiates a preset resource acquisition request to the object node. In some implementations, after receiving the correlation request for correlating the object node to the node group, the server may call the resource acquisition request correlated with the node group, and request to extract resources from the object node. From 210, method 200 proceeds to 212.

At 212, the server queries creditable resources of the object node, and verifies whether the creditable resources include a target resource required by the resource acquisition request. For example, creditable resources include an available credit line of one user or multiple users. From 212, method 200 proceeds to 214.

At 214, when the server verifies the creditable resources include a target resource, the server extracts the target resource from the creditable resources of the object node, and correlates the object node to the node group. In some implementations, when correlating the object node to the node group, the server correspondingly injects the target resource extracted from the object node into a shared resource pool of the node group. The shared resource pool refers to a resource pool corresponding to the node establishing the group, for example, the previously described initial node. That is, resources acquired by nodes in all correlation requests are injected into the resource pool of the initial node, or a resource pool of an intermediate node, for example, an intermediate user established temporarily.

In some implementations, the initial node may store use information of resources in the shared resource pool, for being queried by nodes correlated to the node group. In some implementations, the initial node may further initiate a resource acquisition request to the nodes correlated to the node group. For example, when remaining resources in the shared resource pool are less than a set threshold, a primary node may further initiate a resource acquisition request to the nodes correlates to the node group.

In some implementations, the initial node further opens or transfers, to other nodes correlated to the node group, the privilege of storing the use information of resources in the shared resource pool and the privilege of further initiating a resource acquisition request to the nodes correlated to the node group. In some implementations, the initial node and the object node may both be instant messaging nodes. The established node group may be an instant messaging group. The initial node and the server transmits requests, such as the correlation request and the resource acquisition request, between one another as well as between the object node and the server by using instant messages. After 214, method 200 stops.

In some implementations, method 200 may be used in an instant messaging environment. For instance, in the instant messaging environment, an instant messaging server, based on the method 200, carries out operations such as establishing a group and allowing users to join the group. Specifically, at 202 and 204, the instant messaging server receives a group establishment operation of a user, supposing a user A (corresponding to the previously described initial node), on a client terminal thereof. The group establishment operation includes an operation of acquiring funds of the user A (corresponding to the previously described resource acquisition, which may be considered as a condition of joining the group). The instant messaging server establishes a group for the user A, generates a group ID, and generates a corresponding QR code or other types of information. For instance, suppose that the group is a group 1 (that is, the previously described node group). At 206 to 214, other users may join the group 1 by, for example, inputting the group ID or scanning the group QR code. For example, a user B may join the group 1 by scanning the QR code (that is, sending a correlation request to the server). In this way, the instant messaging server requests for acquiring funds from the user B based on the correlation request and based on the fund operation of group 1. After user B accepts the fund acquisition, the instant messaging server may extract corresponding funds from funds corresponding to the user B, and add the user B into the group 1.

Figure 3:
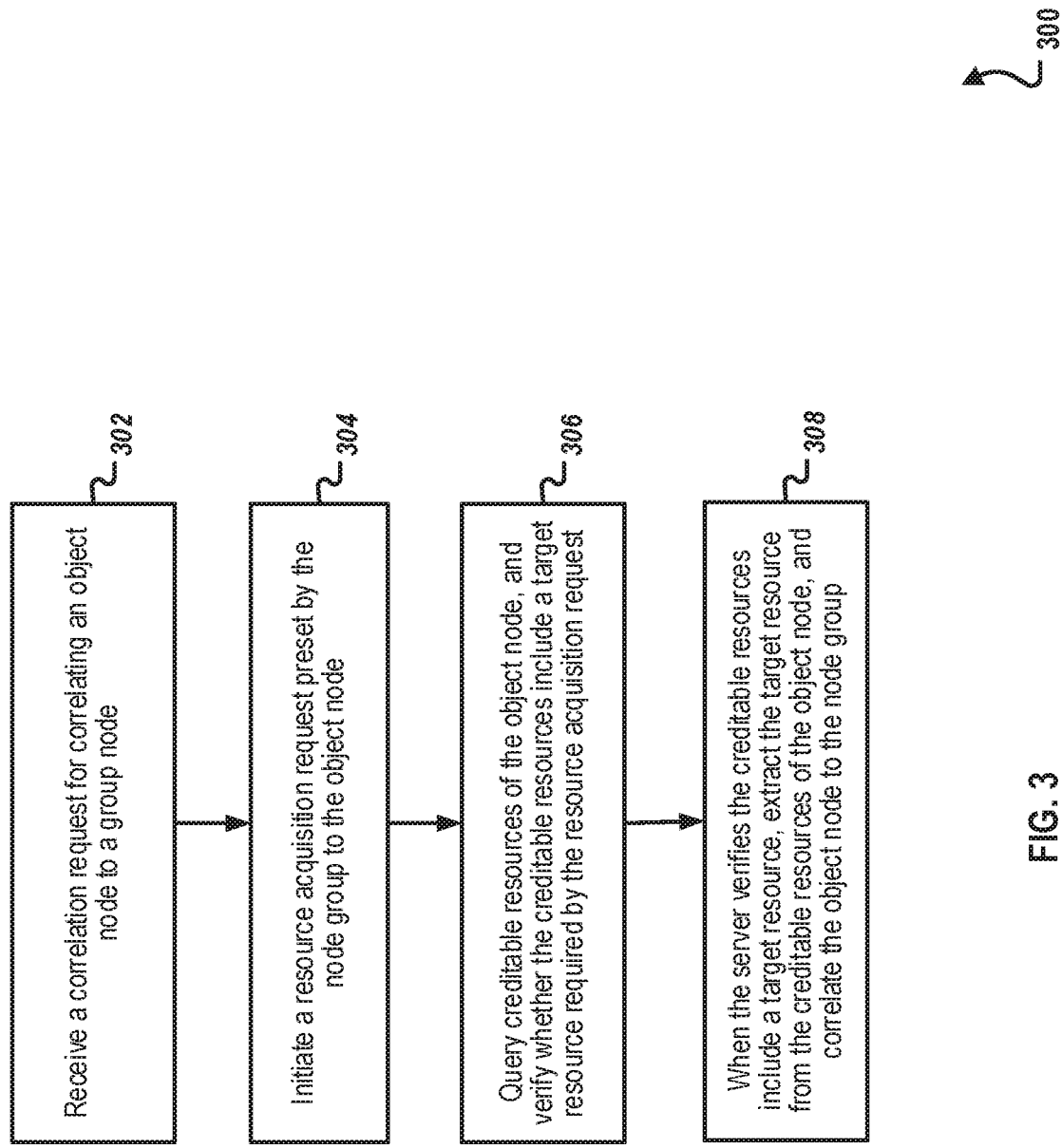
FIG. 3 is a flowchart illustrating an example of a computer-implemented method for providing transaction interactions between node groups, according to an implementation of the present disclosure.

FIG. 3 is a flowchart illustrating an example of a computer-implemented method 300 configured to provide transaction interactions between node groups, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, a correlation request for correlating an object node to a node group is received. From 302, method 300 proceeds to 304.

At 304, a resource acquisition request preset by the node group is initiated to the object node. From 304, method 300 proceeds to 306.

At 306, creditable resources of the object node are queried, and it is verified whether the creditable resources include a target resource required by the resource acquisition request. From 306, method 300 proceeds to 308.

At 308, when the server verifies the creditable resources include a target resource, the target resource is extracted from the creditable resources of the object node, and the object node is correlated to the node group.

In some implementations, the transaction processing method further includes injecting the target resource extracted from the creditable resources of the object node into a shared resource pool of the node group. After 308, method 300 stops.

Figure 4:
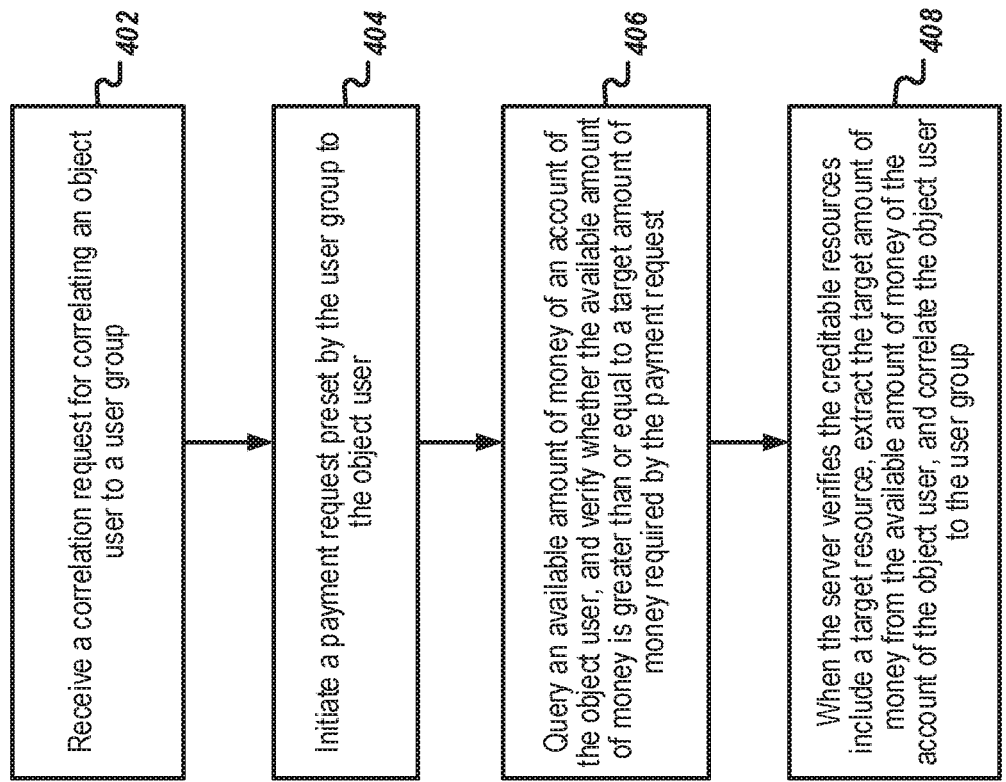
FIG. 4 is a flowchart illustrating an example of a computer-implemented method for providing transaction interactions between node groups, according to an implementation of the present disclosure.

FIG. 4 is a flowchart illustrating an example of a computer-implemented method 400 configured to provide transaction interactions between node groups, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

In some implementations, as illustrated in FIG. 4, a transaction processing method in combination with a specific application scenario according to the present application is introduced. In some implementations, this method may be executed on a server.

At 402, a correlation request for correlating an object user to a user group is received. In some implementations, the user group may be established by a server in response to a group establishment request of a user. The user may be used an initial user correlated with the user group first. The object user may be any user, except for the initial user, applying for being correlated to the user group. In some implementations, the object user may be, for example, an instant messaging user, and the user group may be, for example, an instant messaging group. The instant messaging user may be correlated to the instant messaging group by sending an instant message to the server. From 402, method 400 proceeds to 404.

At 404, a payment request preset by the user group is initiated to the object user. In some implementations, when the initial user send the group establishment request to the server, the group establishment request includes a payment request set by the initial user. When responding to the group establishment request and generating a group identifier corresponding to the established user group, the server may further correlate the group identifier with the payment request set by the initial user. In this way, this is equivalent to the payment request that is preset by the user group.

In some implementations, after the server receives the correlation request sent by the instant messaging user by using an instant message, the server further initiates, by using an instant message, the payment requested preset by the instant messaging group to the instant messaging user. From 404, method 400 proceeds to 406.

At 406, an available amount of money of an account of the object user is queried, and it is verified whether the available amount of money is greater than or equal to a target amount of money required by the payment request. From 406, method proceeds to 408.

At 408, when the server verifies the creditable resources include a target resource, the target amount of money is extracted from the available amount of money of a financial account of the object user, and the object user is correlated to the user group. After 408, method 400 stops.

In some implementations, during a specific payment process, the server may query the available amount of money of an account of the instant messaging user, and verify whether an available amount of money is sufficient for paying the target amount of money required by the payment request. When the server verifies the creditable resources include a target resource, the server extracts the target amount of money from the account of the instant messaging user, and correlates the instant messaging user to the instant messaging group. In some implementations, the transaction processing method further includes injecting the target amount of money extracted from the available amount of money of the account of the object user into a shared account of the node group. The shared account may be an account of the initial user or an account established temporarily.

In some implementations, for the shared account of the user group, the initial user edits and stores use information of the amount of money in the shared account, for users correlated to the user group to query. The initial user may further initiate a payment request to the users correlated to the user group. For example, when the remaining amount of money in the shared account is less than a set threshold, the initial user further initiates a payment request to the users correlated to the user group.

In some implementations, the initial user may further open or transfer, to other users correlated to the user group, the privilege of editing and storing the use information of the amount of money in the shared account and the privilege of further initiating a payment request to the users correlated to the user group. It can be appreciated that the previously described steps may be implemented in a server as part of a network architecture. In another instance, the steps may also be implemented between various network architectures.

For example, in an instant messaging application, a user A may start a group joining interface by triggering a group joining button (which, for example, may be integrated in a chat input item). The user A may select, in the group joining interface, an instant messaging application number of a user group to which the user A expects to join, and send a generated group joining request to the server. After receiving the request, the server may send, to the user A, payment request information (for example, a request for extracting 200 Yuan from an account of the user A) preset by the user group. During payment, the server may query the available amount of money in the account of the user A, and judge whether the balance is greater than 200 Yuan. If the balance is greater than 200 Yuan, the server then extracts 200 Yuan from the account of user A, and accepts the group joining request of the user A.

In some implementations, the group joining interface may use a separated server that can be correlated to a server of the instant messaging application and a server for acquiring the account funds of the user (for instance, the server may be the same server as the server of the instant messaging application and the server of the account funds). The server (for example, a group server) may implement operations such as adding the user to a user, verification on whether the user is authorized, and fund payment. The process may be considered as being accomplished by cooperation of the instant messaging application server, the group server, and the account fund server. That is, sending and receiving of the request may be implemented in the instant messaging server, verification on whether the user is authorized, and adding the user to a group may be implemented in the group server, and deduction of funds from the user account may be implemented in the account fund server.

It can be seen that in different network architectures or different implementations, the network architecture where the network node is located may implement operations such as processing a transaction processing request. That is, the network architecture may implement all of the previously described method steps separately. In some implementations, the network architecture may also be docked with another network architecture platform. For example, a part of processing on the transaction processing request may be docked to another system for being processed, or another system may be called for processing, and the network architecture may implement a connection function and the like. The previously described steps can be executed, regardless of which network architecture is used.

Figure 5:
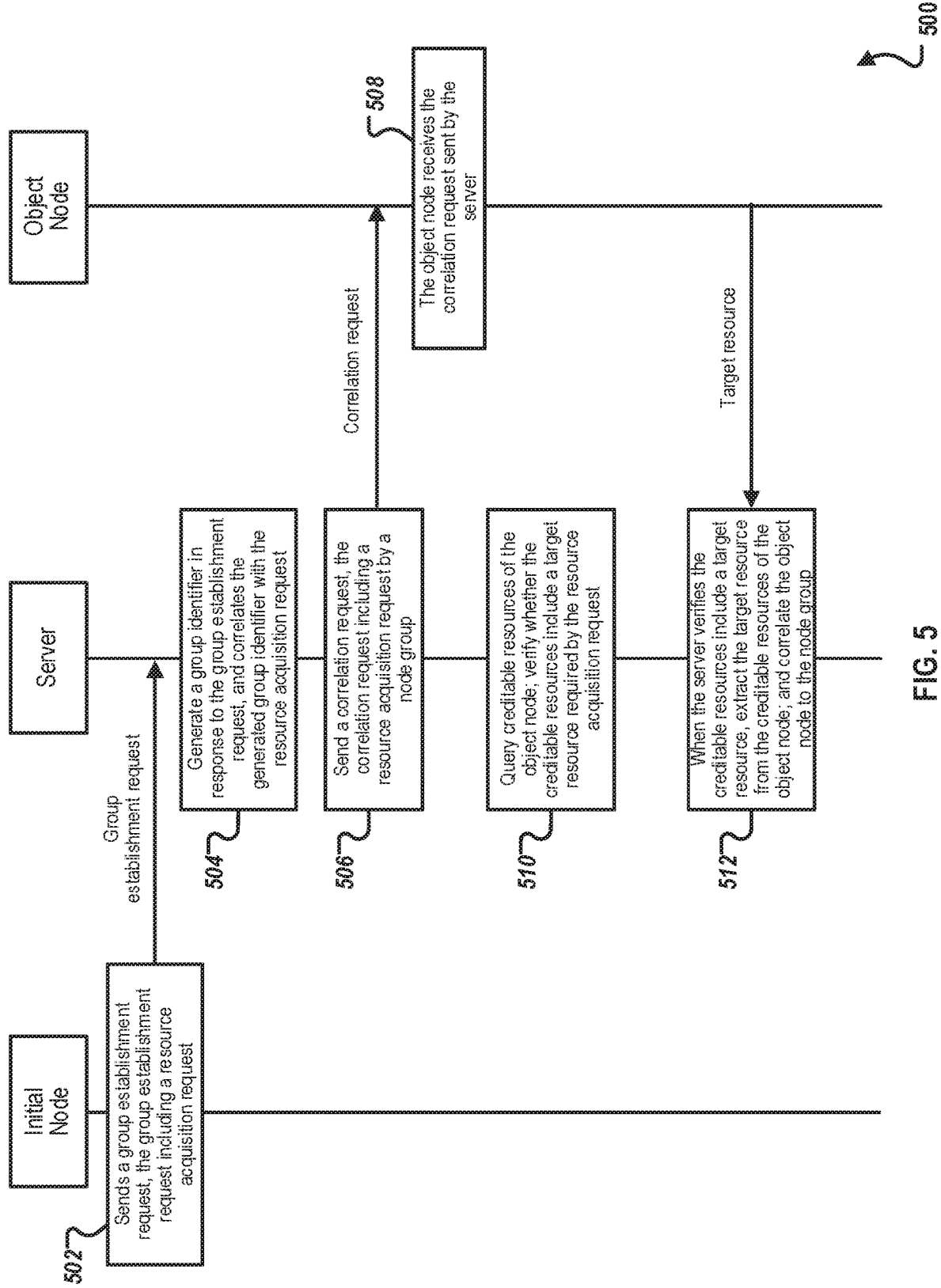
FIG. 5 is a flowchart illustrating an example of a computer-implemented method for providing transaction interactions between node groups, according to an implementation of the present disclosure.

FIG. 5 is a flowchart illustrating an example of a computer-implemented method 500 configured to provide transaction interactions between node groups, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, similar to 202, an initial node sends a group establishment request to a server, the group establishment request including a resource acquisition request. From 502, method 500 proceeds to 504.

At 504, similar to 204, the server generates a group identifier in response to the group establishment request, and correlates the generated group identifier with the resource acquisition request. From 504, method 500 proceeds to 506.

At 506, the server sends a correlation request to an object node, the correlation request including a resource acquisition request preset by a node group. In some implementations, when sending the correlation request to the object node, the server may encapsulate the resource acquisition request preset by the node group into the correlation request, and send to the object node together. From 506, method 500 proceeds to 508.

At 508, the object node receives the correlation request sent by the server. From 508, method 500 proceeds to 510.

At 510, the server queries creditable resources of the object node, and verifies whether the creditable resources include a target resource required by the resource acquisition request. From 510, method 500 proceeds to 512.

At 512, when the server verifies the creditable resources include a target resource, the server extracts the target resource from the creditable resources of the object node, and correlates the object node to the node group. In some implementations, when correlating the object node to the node group, the server may correspondingly inject the target resource extracted from the object node into a shared resource pool of the node group. The initial node may store use information of resources in the shared resource pool, for being queried by nodes correlated to the node group. After 512, method 500 stops.

In some implementations, the initial node may further initiate a resource acquisition request to the nodes correlated to the node group. For example, when remaining resources in the shared resource pool are less than a set threshold, a primary node may further initiate a resource acquisition request to the node correlated to the node group.

In some implementations, the initial node may further open or transfer, to other nodes correlated to the node group, the privilege of storing the use information of resources in the shared resource pool and the privilege of further initiating a resource acquisition request to the nodes correlated to the node group. In some implementations, the initial node and the object node may both be instant messaging nodes. The established node may be an instant messaging group. Requests such as the correlation request and the resource acquisition request may be transmitted between the initial node and the server as well as between the object node and the server by using instant messages.

In some implementations, method 500 is used in an instant messaging environment. For instance, in the instant messaging environment, an instant messaging server may, based on the method 500, carry out operations such as establishing a group and allowing users to join the group. Specifically, at 502 and 504, the instant messaging server receives a group establishment operation of a user, supposing a user A (corresponding to the previously described initial node), on a client terminal thereof. The group establishment operation includes an operation of acquiring funds of the user A (corresponding to the previously described resource acquisition, which may be considered as a condition of joining the group). The instant messaging server establishes a group for the user A, generates a group ID, and generates a corresponding QR code or other types of information. For instance, suppose that the group is a group 1 (that is, the previously described node group). At 506 to 512, the user A, for example, invites a user B to join the group 1, and also, requests for acquiring funds from the user B while inviting the user B to join the group. After the user B agrees with the fund acquisition, the instant messaging server extract corresponding funds from funds corresponding to the user B, and add the user B into the group 1.

Figure 6:
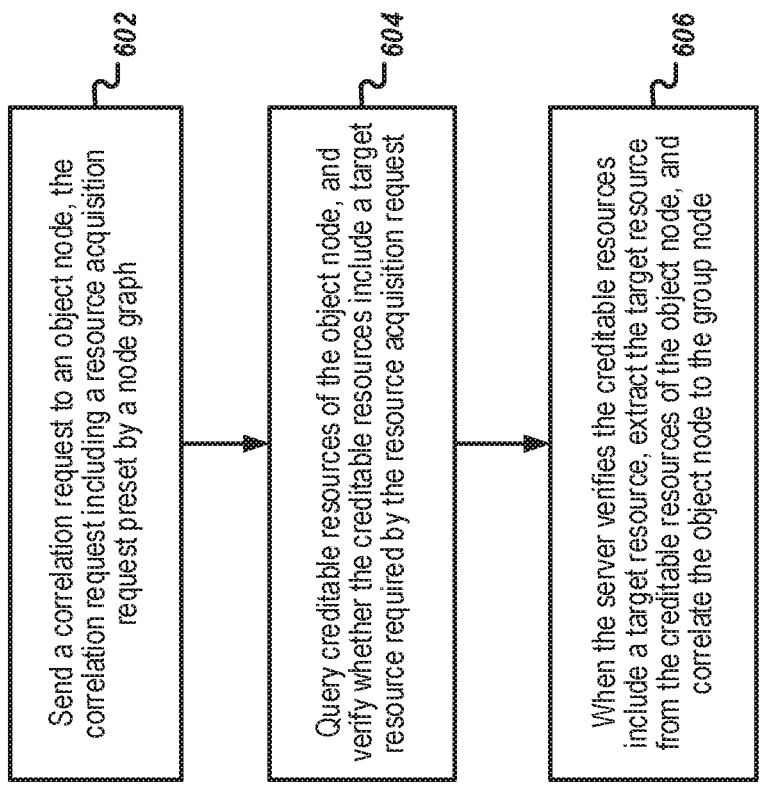
FIG. 6 is a flowchart illustrating an example of a computer-implemented method for providing transaction interactions between node groups, according to an implementation of the present disclosure.

FIG. 6 is a flowchart illustrating an example of a computer-implemented method 600 configured to provide transaction interactions between node groups, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a correlation request is sent to an object node, the correlation request including a resource acquisition request preset by a node group. From 602, method 600 proceeds to 604.

At 604, creditable resources of the object node are queried, and it is verified whether the creditable resources include a target resource required by the resource acquisition request. From 604, method 600 proceeds to 606.

At 606, when the server verifies the creditable resources include a target resource, the target resource is extracted from the creditable resources of the object node, and the object node is correlated to the node group. After 606, method stops.

In some implementations, this transaction processing method 600 further includes the target resource extracted from the creditable resources of the object node into a shared resource pool of the node group.

Figure 7:
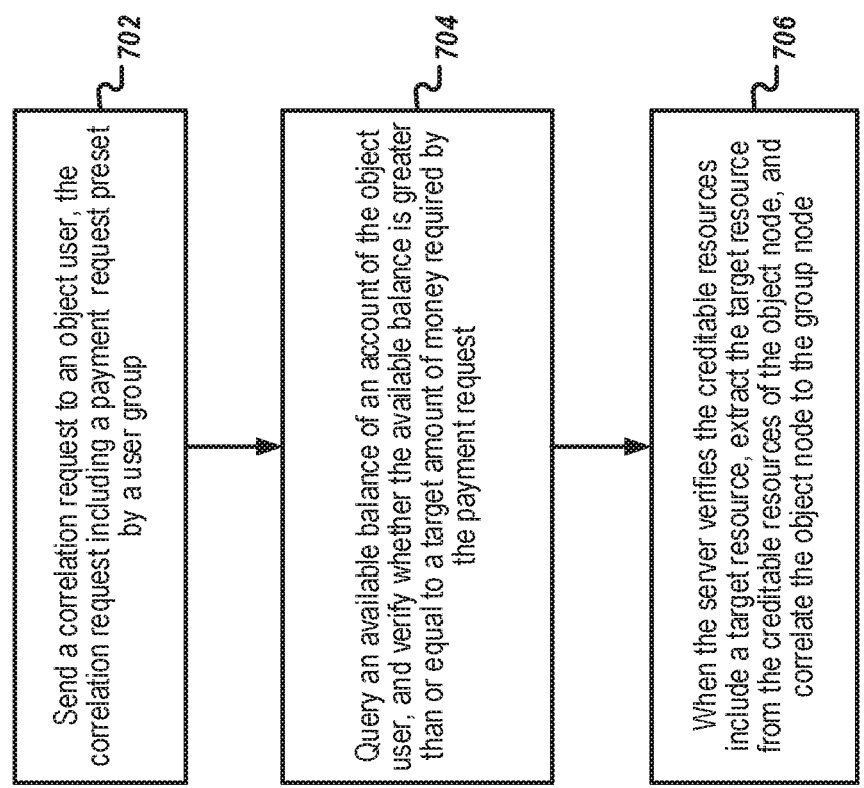
FIG. 7 is a flowchart illustrating an example of a computer-implemented method for providing transaction interactions between node groups, according to an implementation of the present disclosure.

FIG. 7 is a flowchart illustrating an example of a computer-implemented method 700 configured to provide transaction interactions between node groups, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a correlation request is sent to an object user, the correlation request including a payment request preset by a user group. In some implementations, the object user may be, for example, an instant messaging user, and the user group may be, for example, an instant messaging group. The server applies for correlation of an instant messaging user with an instant messaging group by sending an instant message to the instant messaging user. The instant message includes a payment request preset by the instant messaging group. From 702, method 700 proceeds to 704.

At 704, an available amount of money of an account of the object user is queried, and it is verified whether the available amount of money is greater than or equal to a target amount of money required by the payment request. From 704, method 700 proceeds to 706.

At 706, when the server verifies the creditable resources include a target resource, the target amount of money is extracted from the available amount of money of the account of the object user, and the object user is correlated to the user group. In some implementations, after receiving the instant message, the instant messaging user may respond to the payment request in the instant message. The server further queries the available amount of money of an account of the instant messaging user, and verify whether the available amount of money is sufficient for paying the target amount of money required by the payment request. When the server verifies the creditable resources include a target resource, the server extracts the target amount of money from the account of the instant messaging user, and correlates the instant messaging user to the instant messaging group. After 706, method 700 stops.

In some implementations, the transaction processing method further includes injecting the target amount of money extracted from the available amount of money of the account of the object user into a shared account of the user group. For the shared account of the user group, the initial user edits and stores use information of the amount of money in the shared account, for users correlated to the user group to query. The initial user may further initiate a payment request to the users correlated to the user group. For example, when the remaining resources in the shared account are less than a set threshold, the initial user may further initiate a payment request to the users correlated to the user group.

In some implementations, the initial user may further open or transfer, to other nodes correlated to the user group, the privilege of editing and storing the use information of the amount of money in the shared account and the privilege of further initiating a payment request to the users correlated to the user group. It can be appreciated that the method 700 may be implemented in a server as part of a network architecture. In another manner, the steps may also be implemented between different network architectures.

For instance, in an instant messaging application, a user A in the user group starts a group joining interface by triggering a group joining invitation button (which, for example, may be integrated in a chat input item). The user A may select, in the group joining interface, an instant messaging application number of a user B whom the user A expects to invite to join the group, and sends a generated group joining request to the user B through the server. The group joining request includes payment request information (for example, a request for extracting 200 Yuan from an account of the user B) preset by the user group.

In some implementations, during payment, the server may query the available amount of money in the account of the user B, and judge whether the balance is greater than 200 Yuan. If the balance is greater than 200 Yuan, the server extracts 200 Yuan from the account of the user B, and adds the user B into the user group. [Inventors: Where is the money stored once the 200 Yuan is extracted from the account of user B?]

In some implementations, the group adding interface may use a separated server that can be correlated to a server of the instant messaging application, such as server 109, and a server for acquiring the account funds of the user (definitely, the server may be the same server as the server of the instant messaging application and the server of the account funds). The server (for example, a group server) may implement operations such as adding the user to a group, verification on whether the user is authorized, and fund payments. The process may be considered as being accomplished by cooperation of the instant messaging application server, the group server, and the account fund server. For instance, sending and receiving of the request in the instant messaging server, verifying whether the user is authorized, and adding the user to a group may be implemented in the group server, and deduction of funds from the user account is implemented in the account fund server.

In some implementations, it can be seen that in different network architectures, the network architecture where the network node is located may implement operations such as processing a transaction processing request. That is, the network architecture may implement all of the previously described method steps separately. In addition, the network architecture may also be docked with another network architecture platform. For example, a part of processing on the transaction processing request may be docked to another system for being processed, or another system may be called for processing, and the network architecture may implement a connection function and the like. The previously described method can be executed, regardless of which network architecture is used.

It can be appreciated that the previously described methods may be applied to group establishment and group joining of instant messaging. Moreover, during group establishment, a group establishment condition may be set. For example, resources such as funds of a group member joining the group may be acquired. In this way, only users who provide corresponding resources can join the group. In another example, consider that a group of individuals, such as a first user, a second user, and a third user eat dinner together on a daily basis. During group establishment, the system will require funds from each device corresponding to each of the first, second, and third users. The funds will be placed in a public fund pool for payment of the daily dinner meal. Only those users who provide funds to the public fund pool will be allowed to pay for the daily dinner meal from the public fund pool.

In another example, a first user sets up a group chat between the first user, a second user, and a third user. The first user sets a money value for this group chat that each user must pay in order to enter the group chat. A public fund pool is stored that includes the money value entry fee each user pays entering the group chat. If a fourth user requests to join the group chat, the fourth user must pay the money value entry fee to enter the group chat. If the fourth user decides to pay with credit, the server holding the public fund pool queries a creditable resource of the fourth user to determine whether the fourth user's credit limit is high enough to pay the money value entry fee. In another example, the server can a query a creditable resource of the fourth user to determine whether the fourth user's bank account includes enough funds to pay the money value entry fee.

Figure 8:
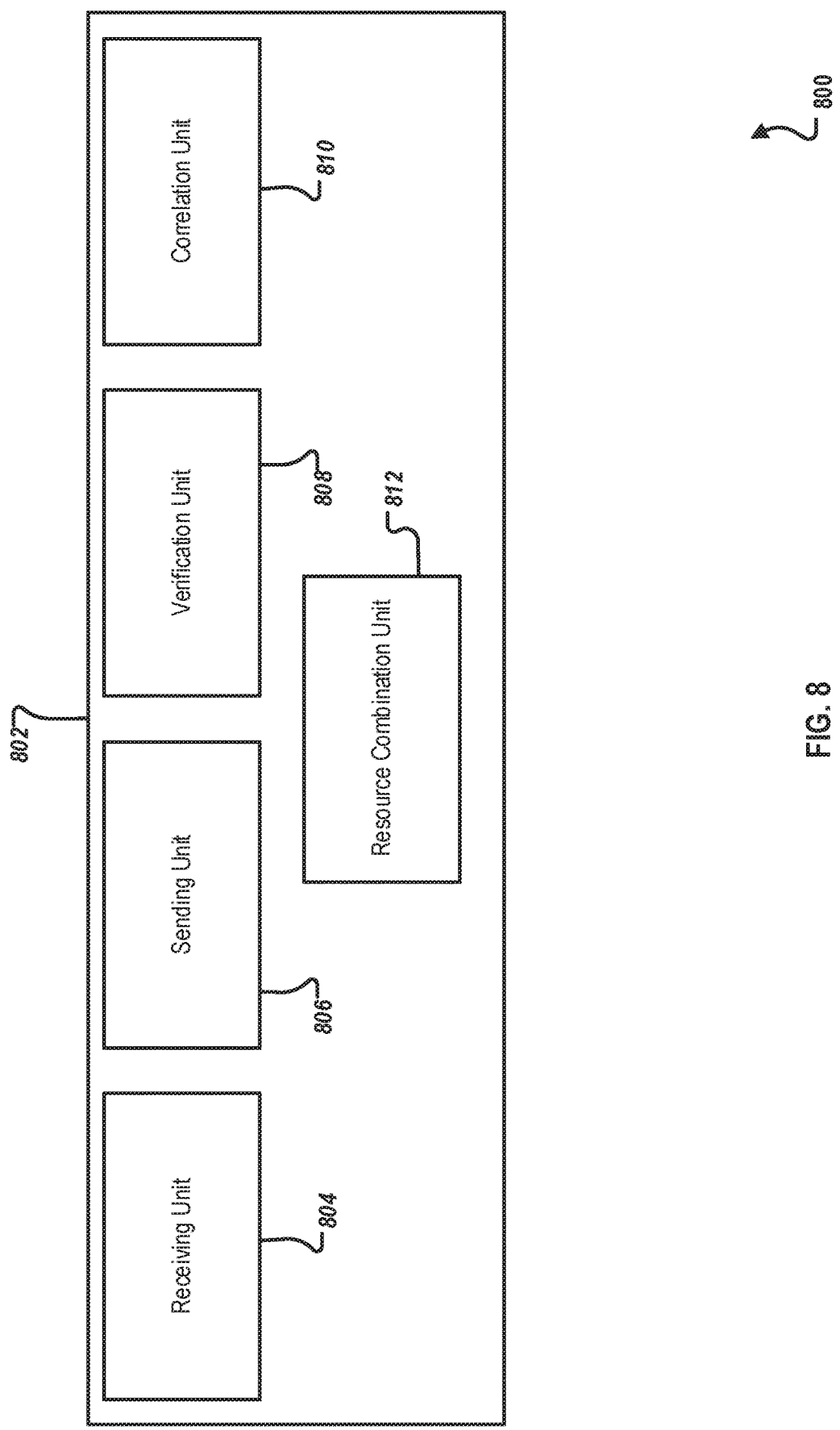
FIG. 8 is a block diagram illustrating an example of a computer-implemented system for providing transaction interactions between node groups, according to an implementation of the present disclosure.

FIG. 8 is a block diagram illustrating an example of a computer-implemented system 800 configured to provide transaction interactions between node groups, according to an implementation of the present disclosure. In some implementations, the computer-implemented system 800 includes a transaction processing system 802. The transaction processing system 802 includes a receiving unit 804, a sending unit 806, a verification unit 808, a correlation unit 810, and a resource combination unit 812.

In some implementations, the receiving unit 804 is configured to receive a correlation request for correlating an object node to a node group. Additionally, the receiving unit 804 is configured to receive a correlation request for correlating an object user to a user group.

In some implementations, a sending unit 806 is configured to initiate a resource acquisition request preset by the node group to the object node. Additionally, the sending unit 806 is configured to initiate a payment request preset by the user group to the object user.

In some implementations, a verification unit 808 is configured to query creditable resources of the object node, and verify whether the creditable resources include a target resource required by the resource acquisition request. Additionally, the verification unit 808 is configured to query an available amount of money of an account of the object user, and verify whether the available amount of money is greater than or equal to a target amount of money required by the payment request.

In some implementations, a correlation unit 810 is configured to, when the server verifies the creditable resources include a target resource, extract the target resource from the creditable resources of the object node, and correlate the object node to the node group. Additionally, the correlation unit 810 is configured to, when the server verifies the creditable resources include a target resource, extract the target amount of money from the available amount of money of the account of the object user, and correlate the object user to the user group.

In some implementations, a resource combination unit 812 is configured to inject the target resource extracted from the creditable resources of the object node into a shared resource pool of the node group. Additionally, the resource combination unit 812 is configured to inject the target amount of money extracted from the available amount of money of the account of the object user into a shared account of the user group.

In some implementations, the object user is an instant messaging user. In some implementations, the user group is an instant messaging group. In some implementations, the correlation request and the payment request are transmitted by using instant messages.

Figure 9:
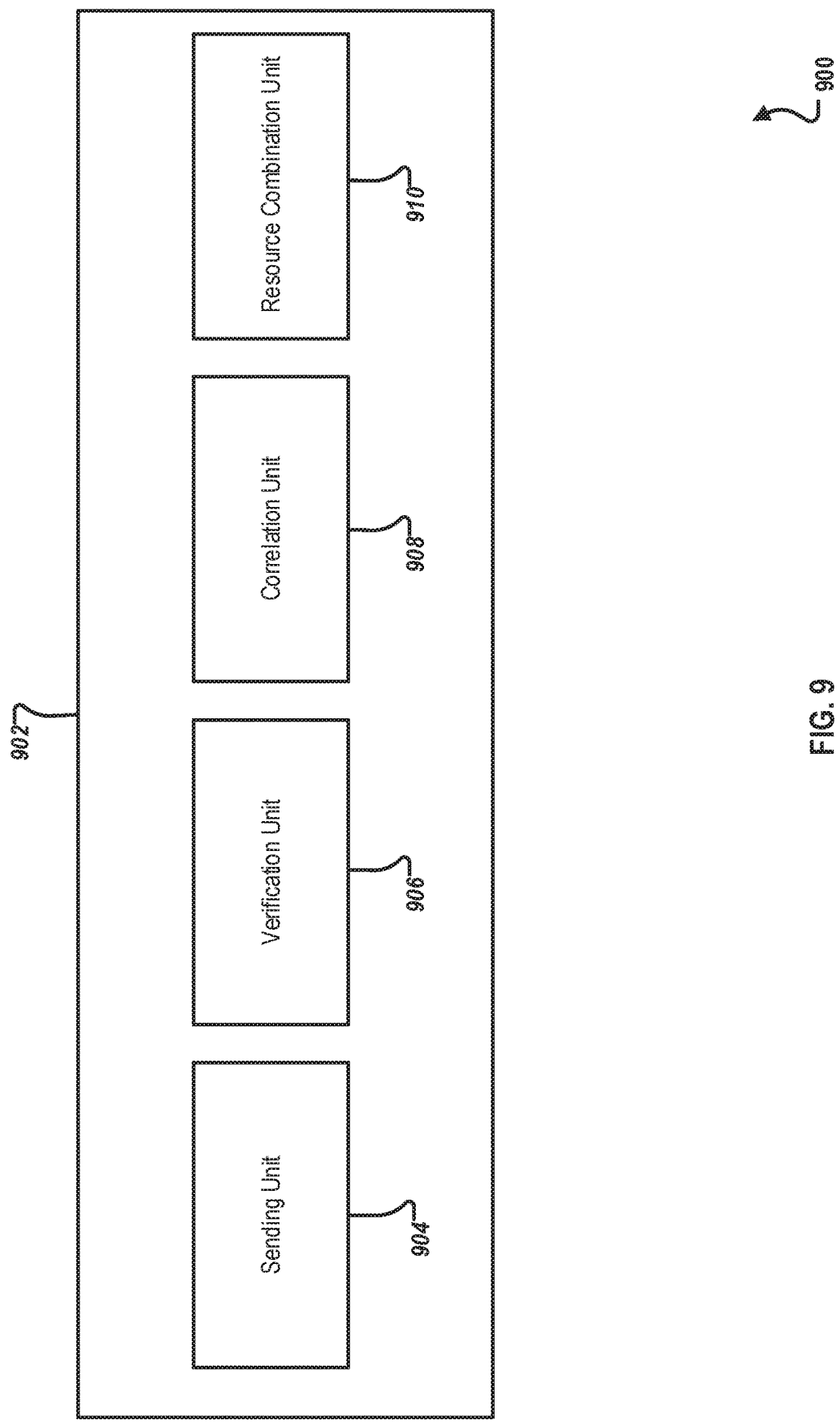
FIG. 9 is a block diagram illustrating an example of a computer-implemented system for providing transaction interactions between node groups, according to an implementation of the present disclosure.

FIG. 9 is a block diagram illustrating an example of a computer-implemented system 900 configured to provide transaction interactions between node groups, according to an implementation of the present disclosure. In some implementations, the computer-implemented system 900 includes a transaction processing system 902. The transaction processing system 902 includes a sending unit 904, a verification unit 906, a correlation unit 908, and a resource combination unit 910.

In some implementations, a sending unit 904 is configured to send a correlation request to an object node, the correlation request including a resource acquisition request preset by a node group. Additionally, the sending unit 904 is configured to send a correlation request to an object user, the correlation request including a payment request preset by a user group.

In some implementations, a verification unit 906 is configured to query creditable resources of the object node, and verify whether the creditable resources include a target resource required by the resource acquisition request. Additionally, the verification unit 906 is configured to query an available amount of money of an account of the object user, and verify whether the available amount of money is greater than or equal to a target amount of money required by the payment request.

In some implementations, a correlation unit 908 is configured to, when the server verifies the creditable resources include a target resource, extract the target resource from the creditable resources of the object node, and correlate the object node to the node group. Additionally, the correlation unit 908 is configured to, when the server verifies the creditable resources include a target resource, extract the target amount of money from the available amount of money of the account of the object user, and correlate the object user to the user group.

In some implementations, a resource combination unit 910 is configured to inject the target resource extracted from the creditable resources of the object node into a shared resource pool of the node group. Additionally, the resource combination unit 910 is configured to inject the target amount of money extracted from the available amount of money of the account of the object user into a shared account of the user group.

Figure 10:
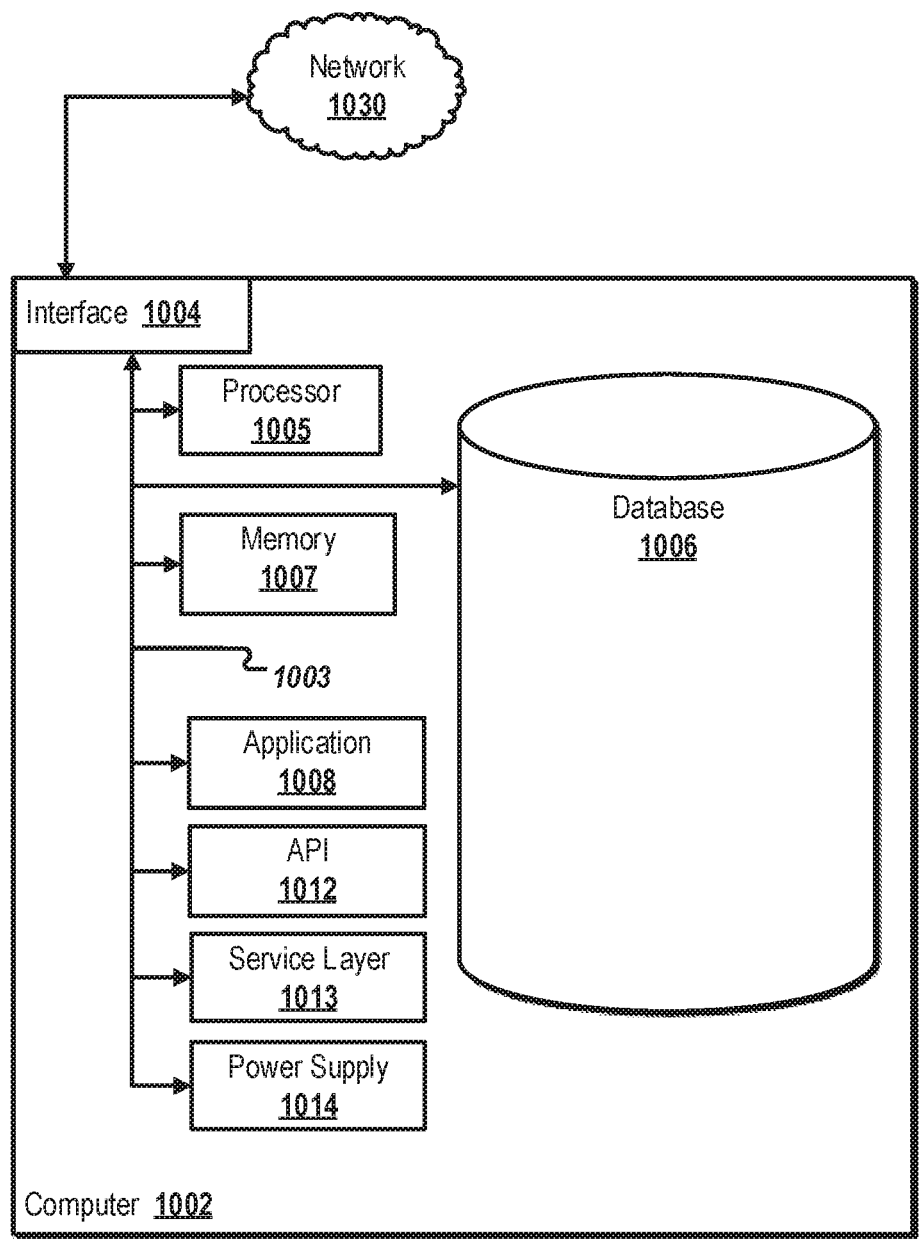
FIG. 10 is a block diagram illustrating an example of a computer-implemented system used to provide computational functionalities associated with described algorithms, methods, functions, processes, flows, and procedures, according to an implementation of the present disclosure.

FIG. 10 is a block diagram illustrating an example of a computer-implemented system 1000 used to provide computational functionalities associated with described algorithms, methods, functions, processes, flows, and procedures, according to an implementation of the present disclosure. In the illustrated implementation, System 1000 includes a Computer 1002 and a Network 1030.

The illustrated Computer 1002 is intended to encompass any computing device such as a server, desktop computer, laptop, notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1002 can include an input device, such as a keypad, keyboard, touch screen, another input device, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as a client, network component, a server, a database or another persistency, another role, or a combination of roles for performing the subject matter described in the present disclosure. The illustrated Computer 1002 is communicably coupled with a Network 1030. In some implementations, one or more components of the Computer 1002 can be configured to operate within an environment, including cloud-computing-based, local, global, another environment, or a combination of environments.

At a high level, the Computer 1002 is an electronic computing device operable to receive, transmit, process, store, or manage data and information associated with the described subject matter. According to some implementations, the Computer 1002 can also include or be communicably coupled with a server, including an application server, e-mail server, web server, caching server, streaming data server, another server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 1003. In some implementations, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1002, alternative implementations can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular implementations of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular implementations of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory, conventional, or another type of database storing data consistent with the present disclosure. In some implementations, Database 1006 can be a combination of two or more different database types (for example, a hybrid in-memory and conventional database) according to particular needs, desires, or particular implementations of the Computer 1002 and the described functionality. Although illustrated as a single Database 1006, two or more databases of similar or differing types can be used according to particular needs, desires, or particular implementations of the Computer 1002 and the described functionality. While Database 1006 is illustrated as an integral component of the Computer 1002, in alternative implementations, Database 1006 can be external to the Computer 1002. In some implementations, the Database 1006 can hold the previously described relationship data, payment data, to-be-read data, to-be-written data, social network data, and operation data.

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some implementations, Memory 1007 can be a combination of two or more different types of memory (for example, a combination of semiconductor and magnetic storage) according to particular needs, desires, or particular implementations of the Computer 1002 and the described functionality. Although illustrated as a single Memory 1007, two or more Memories 1007 or similar or differing types can be used according to particular needs, desires, or particular implementations of the Computer 1002 and the described functionality. While Memory 1007 is illustrated as an integral component of the Computer 1002, in alternative implementations, Memory 1007 can be external to the Computer 1002.

The Application 1008 is an algorithmic software engine providing functionality according to particular needs, desires, or particular implementations of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative implementations, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some implementations, the Power Supply 1014 can include power-conversion or management circuits (including recharging, standby, or another power management functionality). In some implementations, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

Described implementations of the subject matter can include one or more features, alone or in combination.

For example, in a first implementation, a computer-implemented method, comprising: receiving a correlation request for correlating an object node to a node group; initiating a resource acquisition request preset by the node group to the object node; querying creditable resources of the object node, and verifying whether the creditable resources include a target resource required by the resource acquisition request; and when the server verifies the creditable resources include a target resource: extracting the target resource from the creditable resources of the object node; and correlating the object node to the node group.

The foregoing and other described implementations can each, optionally, include one or more of the following features:

A first feature, combinable with any of the following features, wherein correlating the object node to the node group further comprises injecting the target resource extracted from the creditable resources of the object node into a shared resource pool of the node group.

A second feature, combinable with any of the previous or following features, further comprising receiving, a group establishment request, from an initial node, the group establishment request including the resource acquisition request.

A third feature, combinable with any of the previous or following features, further comprising: generating a group identifier in response to receiving the group establishment request from the initial node; and correlating the group identifier with the resource acquisition request.

A fourth feature, combinable with any of the previous or following features, wherein the group identifier identifies a correlation relationship between a node and a corresponding node group.

A fifth feature, combinable with any of the previous or following features, wherein the initial node is a first instant messaging node and the object node is a second instant messaging node.

In a second implementation, a non-transitory computer-readable medium storing software comprising instructions executable by one or more computers which, upon such execution, cause the one or more computers to perform operations comprising: receiving a correlation request for correlating an object node to a node group; initiating a resource acquisition request preset by the node group to the object node; querying creditable resources of the object node, and verifying whether the creditable resources include a target resource required by the resource acquisition request; and when the server verifies the creditable resources include a target resource: extracting the target resource from the creditable resources of the object node; and correlating the object node to the node group.

The foregoing and other described implementations can each, optionally, include one or more of the following features:

A first feature, combinable with any of the following features, wherein correlating the object node to the node group further comprises injecting the target resource extracted from the creditable resources of the object node into a shared resource pool of the node group.

A second feature, combinable with any of the previous or following features, further comprising receiving, a group establishment request, from an initial node, the group establishment request including the resource acquisition request.

A third feature, combinable with any of the previous or following features, further comprising: generating a group identifier in response to receiving the group establishment request from the initial node; and correlating the group identifier with the resource acquisition request.

A fourth feature, combinable with any of the previous or following features, wherein the group identifier identifies a correlation relationship between a node and a corresponding node group.

A fifth feature, combinable with any of the previous or following features, wherein the initial node is a first instant messaging node and the object node is a second instant messaging node.

In a third implementations, a computer-implemented system, comprising: a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a correlation request for correlating an object node to a node group; initiating a resource acquisition request preset by the node group to the object node; querying creditable resources of the object node, and verifying whether the creditable resources include a target resource required by the resource acquisition request; and when the server verifies the creditable resources include a target resource: extracting the target resource from the creditable resources of the object node; and correlating the object node to the node group.

The foregoing and other described implementations can each, optionally, include one or more of the following features:

A first feature, combinable with any of the following features, wherein correlating the object node to the node group further comprises injecting the target resource extracted from the creditable resources of the object node into a shared resource pool of the node group.

A second feature, combinable with any of the previous or following features, further comprising receiving, a group establishment request, from an initial node, the group establishment request including the resource acquisition request.

A third feature, combinable with any of the previous or following features, further comprising: generating a group identifier in response to receiving the group establishment request from the initial node; and correlating the group identifier with the resource acquisition request.

A fourth feature, combinable with any of the previous or following features, wherein the group identifier identifies a correlation relationship between a node and a corresponding node group.

A fifth feature, combinable with any of the previous or following features, wherein the initial node is a first instant messaging node and the object node is a second instant messaging node.

A sixth feature, combinable with any of the previous or following features, wherein the correlation request includes a request from a user to join a chat group.

A seventh feature, combinable with any of the previous or following features, wherein extracting the target resource from the creditable resources of the object node further comprises extracting a target amount of money from an available amount of money of a financial account of the object node.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for transaction processing, comprising:
   receiving, by a server, a group establishment request from an initial node for establishing an online social networking group, the group establishment request comprising a condition of acquiring a predetermined resource from each member of the online social networking group;
   receiving, by the server, the predetermined resource from the initial node, the predetermined resource being placed into a shared resource pool that is accessible to each member of the online social networking group;
   generating, by the server, the online social networking group that includes the initial node as a first member;
   receiving, by the server, a correlation request from an object node to join the online social networking group;
   initiating, by the server, a resource acquisition request preset by the condition of joining the online social networking group to the object node;
   querying, by the server, creditable resources of the object node, and verifying whether the creditable resources comprise the predetermined resource required by the resource acquisition request to provide a verification result; and
   when the verification result is yes,
   extracting, by the server, the predetermined resource from the creditable resources of the object node,
   injecting, by the server, the predetermined resource extracted from the creditable resources of the object node into the shared resource pool of the online social networking group, and
   adding, by the server, the object node to the online social networking group as a second member, wherein after joining the online social networking group, the object node is capable of accessing resources in the shared resource pool.

2. The computer-implemented method of claim 1, wherein the group establishment request includes the resource acquisition request.

3. The computer-implemented method of claim 1, further comprising:
   generating, by the server, a group identifier in response to receiving the group establishment request from the initial node; and
   correlating, by the server, the group identifier with the resource acquisition request.

4. The computer-implemented method of claim 3, wherein the group identifier identifies a correlation relationship between a node and a corresponding node group.

5. The computer-implemented method of claim 1, wherein the initial node is a first instant messaging node and the object node is a second instant messaging node.

6. A computer-implemented system for transaction processing, comprising one or more computers, and one or more computer memory devices interoperably coupled with the one or more computers and having tangible, non-transitory, machine-readable media storing instructions that, when executed by the one or more computers, perform operations comprising:
   receiving, by a server, a group establishment request from an initial node for establishing an online social networking group, the group establishment request comprising a condition of acquiring a predetermined resource from each member of the online social networking group;
   receiving, by the server, the predetermined resource from the initial node, the predetermined resource being placed into a shared resource pool that is accessible to each member of the online social networking group;
   generating, by the server, the online social networking group that includes the initial node as a first member;
   receiving, by the server, a correlation request for correlating from an object node to join the online social networking group;
   initiating, by the server, a resource acquisition request preset by the condition of joining the online social networking group to the object node;
   querying, by the server, creditable resources of the object node, and verifying whether the creditable resources comprise the predetermined resource required by the resource acquisition request to provide a verification result; and
   when the verification result is yes,
   extracting, by the server, the predetermined resource from the creditable resources of the object node, injecting, by the server, the t predetermined resource extracted from the creditable resources of the object node into the shared resource pool of the online social networking group, and adding, by the server, the object node to the online social networking group as a second member, wherein after joining the online social networking group, the object node is capable of accessing resources in the shared resource pool.

7. The computer-implemented system of claim 6, wherein the group establishment request includes the resource acquisition request.

8. The computer-implemented system of claim 6, wherein the operations further comprise:

generating, by the server, a group identifier in response to receiving the group establishment request from the initial node; and correlating, by the server, the group identifier with the resource acquisition request.

9. The computer-implemented system of claim 8, wherein the group identifier identifies a correlation relationship between a node and a corresponding node group.

10. The medium computer-implemented system of claim 6, wherein the initial node is a first instant messaging node and the object node is a second instant messaging node.

11. A computer-implemented method for transaction processing, comprising:

receiving, by a server, a group establishment request from an initial node for establishing an online social networking group, the group establishment request comprising a condition of acquiring a predetermined resource from each member of the online social networking group;

receiving, by the server, the predetermined resource from the initial node, the predetermined resource being placed into a shared resource pool that is accessible to each member of the online social networking group;

generating, by the server, the online social networking group that includes the initial node as a first member;

transmitting, by the server, a correlation request to an object node, the correlation request comprising a resource acquisition request preset by the condition of joining the online social networking group;

querying, by the server, creditable resources of the object node, and verifying whether the creditable resources comprise the predetermined resource required by the resource acquisition request to provide a verification result; and when the verification result is yes, extracting, by the server, the predetermined resource from the creditable resources of the object node, injecting, by the server, the predetermined resource extracted from the creditable resources of the object node into the shared resource pool of the online social networking group, and adding, by the server, the object node to the online social networking group as a second member, wherein after joining the online social networking group, the object node is capable of accessing resources in the shared resource pool.

12. The computer-implemented method of claim 11, wherein the group establishment request includes the resource acquisition request.

13. The computer-implemented method of claim 11, further comprising:

generating, by the server, a group identifier in response to receiving the group establishment request from the initial node; and correlating, by the server, the group identifier with the resource acquisition request.

14. The computer-implemented method of claim 13, wherein the group identifier identifies a correlation relationship between a node and a corresponding node group.

15. The computer-implemented method of claim 11, wherein the initial node is a first instant messaging node and the object node is a second instant messaging node.

* * * * *

UNITED STATES PATENT AND TRADEMARK OFFICE
CERTIFICATE OF CORRECTION

PATENT NO. : 10,922,667 B2
APPLICATION NO. : 15/834976
DATED : February 16, 2021
INVENTOR(S) : Guanhua Chen Page 1 of 1

It is certified that error appears in the above-identified patent and that said Letters Patent is hereby corrected as shown below:

In the Claims

Column 26, Line 54-55, in Claim 6, after "request" delete "for correlating".

Column 27, Line 1, in Claim 6, after "the" delete "t".

Column 27, Line 23, in Claim 10, after "The" delete "medium".

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*